(12) United States Patent
Minami et al.

(10) Patent No.: US 7,812,981 B2
(45) Date of Patent: Oct. 12, 2010

(54) IMAGE PROCESSING APPARATUS

(75) Inventors: Takeshi Minami, Amagasaki (JP); Kenji Matsuhara, Kawanishi (JP); Nobuhiro Mishima, Osaka (JP); Toshihiko Otake, Amagasaki (JP)

(73) Assignee: Minolta Co., Ltd., Osaka (JP)

( * ) Notice: Subject to any disclaimer, the term of this patent is extended or adjusted under 35 U.S.C. 154(b) by 1158 days.

(21) Appl. No.: 10/446,773

(22) Filed: May 29, 2003

(65) Prior Publication Data

US 2004/0141200 A1    Jul. 22, 2004

(30) Foreign Application Priority Data

Jan. 16, 2003    (JP)    ............... 2003-008804

(51) Int. Cl.
     *G06F 3/12*    (2006.01)
(52) U.S. Cl. ............ 358/1.15; 358/1.13; 358/1.6; 707/203; 707/4; 707/200; 340/572.1; 340/10.1; 235/375
(58) Field of Classification Search ........ 358/1.15, 358/1.18, 1.16, 1.14, 1.13, 1.12, 1.6, 1.1, 358/400, 401, 402; 715/512, 200; 340/572.1, 340/568.1, 10.1; 235/492, 382, 375, 385; 713/189, 182, 172; 710/15, 8, 62, 72; 707/203, 707/204, 4, 9, 1, 200; 700/94; 399/24
See application file for complete search history.

(56) References Cited

U.S. PATENT DOCUMENTS

| | | | |
|---|---|---|---|
| 6,008,727 A * | 12/1999 | Want et al. ............... | 340/572.1 |
| 6,127,928 A * | 10/2000 | Issacman et al. ......... | 340/572.1 |
| 6,249,226 B1 * | 6/2001 | Harrison et al. .......... | 340/572.1 |
| 6,259,367 B1 * | 7/2001 | Klein ....................... | 340/572.1 |
| 6,507,716 B2 | 1/2003 | Nomura et al. | |
| 6,585,154 B1 * | 7/2003 | Ostrover et al. ........... | 235/375 |
| 6,676,023 B2 * | 1/2004 | Shinoda ..................... | 235/492 |
| 6,803,856 B1 * | 10/2004 | Murphy et al. ........... | 340/572.1 |
| 6,827,279 B2 * | 12/2004 | Teraura ..................... | 235/492 |
| 7,129,840 B2 * | 10/2006 | Hull et al. ................. | 340/568.1 |
| 7,200,756 B2 * | 4/2007 | Griffin et al. .............. | 713/189 |
| 7,215,436 B2 * | 5/2007 | Hull et al. .................. | 358/1.15 |
| 7,280,044 B2 * | 10/2007 | Kubby ..................... | 340/572.7 |
| 7,428,067 B2 * | 9/2008 | Kiwada ..................... | 358/1.14 |
| 7,450,253 B2 * | 11/2008 | Kiwada ..................... | 358/1.14 |
| 7,561,289 B2 * | 7/2009 | Talley et al. ............... | 358/1.15 |
| 2001/0048823 A1 | 12/2001 | Nomura et al. | |
| 2003/0002081 A1 * | 1/2003 | Leone et al. ............... | 358/1.18 |
| 2003/0164974 A1 * | 9/2003 | Yoda ......................... | 358/1.15 |
| 2005/0010525 A1 * | 1/2005 | Ross et al. .................. | 705/43 |

FOREIGN PATENT DOCUMENTS

| | | |
|---|---|---|
| JP | 2000-321938 | 11/2000 |
| JP | 2001-96814 | 4/2001 |
| JP | 2001-257862 | 9/2001 |
| JP | 2001-334735 | 12/2001 |
| JP | 2002-149370 | 5/2002 |
| JP | 2002-337426 | 11/2002 |

* cited by examiner

*Primary Examiner*—Twyler L Haskins
*Assistant Examiner*—Ashish K Thomas
(74) *Attorney, Agent, or Firm*—Morrison & Foerster LLP (57) ABSTRACT

In order to provide a more user-friendly image processing apparatus, the present invention provides an image processing apparatus that is able to obtain information stored in a contactless IC tag embedded in the document paper, for example, and search for related information based on the obtained information, and display the related information on a display screen like the liquid crystal display panel in the control panel.

18 Claims, 10 Drawing Sheets

| DOCUMENT NAME<br>SERVER NAME<br>PATH NAME | Sales Data in 2002.xls<br>FILE SERVER 200<br>/users/minolta |
|---|---|
| RELATED DOCUMENT NAME<br>SERVER NAME<br>PATH NAME | Sales Data in 2001.xls<br>FILE SERVER 200<br>/users/minolta/archive |
| RELATED DOCUMENT NAME<br>SERVER NAME<br>PATH NAME | Sales Prediction in 2003.ppt<br>FILE SERVER 200<br>/users/minolta |
| RELATED DOCUMENT NAME<br>SERVER NAME<br>PATH NAME | Annual Report in 2001.doc<br>FILE SERVER 200<br>/users/minolta/archive |

IMAGE PROCESSING APPARATUS

This application is based on the application No. 2003-8804 filed in Japan, the content of which is hereby incorporated by reference.

BACKGROUND OF THE INVENTION (1) Field of the Invention

The present invention relates to an image processing apparatus.

(2) Description of Related Art

In recent years, various kinds of multi-functional image processing apparatuses have been put to practical use with multiple functions such as copying, printing, and scanning, as well as searching for files and sending/receiving e-mails by connecting to a network including the Internet. Besides, there have been developments in contactless IC tags (RF-ID) from/to which so-called a reader/writer is able to read and write information by performing radio communication. Contactless IC tags (hereafter, simply referred to as "IC tags") have been recently more and more miniaturized and reduced in price, and there is a proposal made about embedding IC tags 0.4 mm square into paper currency for individual identification.

In this current situation, a technique is disclosed in Japanese Unexamined Patent Application Publication No. 2000-321938, for example, with regard to an image forming apparatus that, when a user who is carrying an ID card comes to the vicinity of the image forming apparatus, reads personal setting information stored in an IC tag and automatically changes the setting in the image forming apparatus.

It is not necessarily the case, however, that the preferred setting for a user is always the same. There also may be some cases where a user desires to use a different function of the multi-functional image processing apparatus each time depending on the image formed on the document, for instance. The technique of the prior art mentioned above has a problem of not being able to cope with such cases.

SUMMARY OF THE INVENTION

The object of the present invention is to provide a more user-friendly image processing apparatus.

The object can be achieved by an image processing apparatus comprising: a reader that reads information, by radio communication, from a device located within a predetermined area; a first controller that performs a search for a file related to the read information; a display; and a second controller that controls the display to change a display screen to one showing a result of the search.

With this arrangement, it is more user-friendly because when a related file is found in the search, it is possible to display the result of the search on the display screen.

BRIEF DESCRIPTION OF THE DRAWINGS

These and other objects, advantages and features of the invention will become apparent from the following description thereof taken in conjunction with the accompanying drawings which illustrate a specific embodiment of the invention.

In the drawings.

DESCRIPTION OF THE PREFERRED EMBODIMENT

The following describes the multi-functional image processing apparatus according to a preferred embodiment of the present invention, with reference to the drawings.

(1) Structure of the Multi-Functional Image Processing Apparatus

Figure 1:
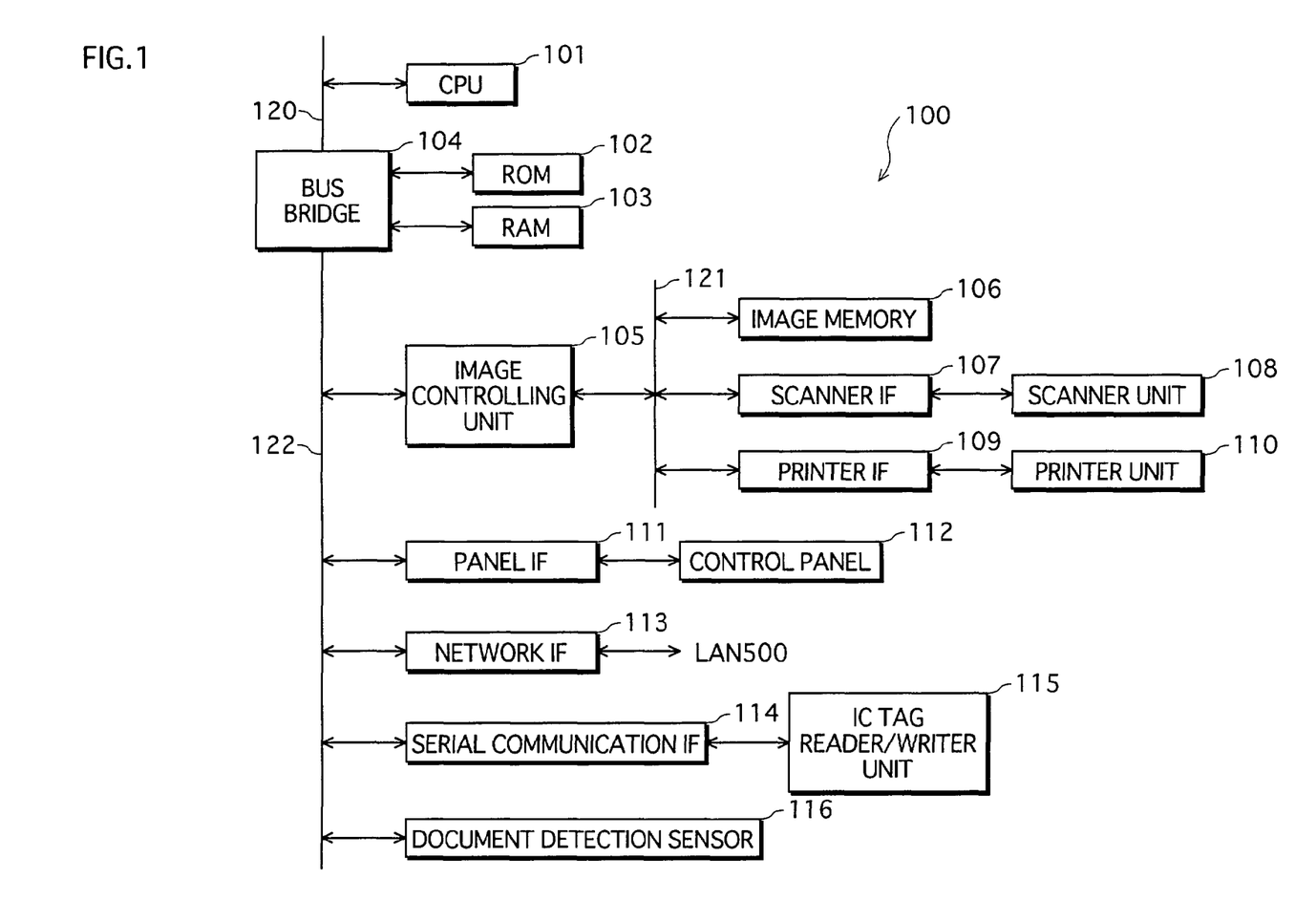
FIG. 1 shows the general structure of a multi-functional image processing apparatus in the embodiment of the present invention.

FIG. 1 is a functional block diagram to show the structure of a part of the multi-functional image processing apparatus 100, (hereafter, referred to as an MFP: multi-functional peripheral) of the preferred embodiment, the part particularly being related to this embodiment of the present invention.

As shown in the drawing, the MFP 100 in this embodiment comprises CPU 101, ROM 102, RAM 103, a bus bridge 104, an image controlling unit 105, an image memory 106, a scanner IF (interface) 107, a scanner unit 108, a printer IF 109, a printer unit 110, a panel IF 111, a control panel 112, a network IF 113, a serial communication IF 114, IC tag reader/writer unit 115, and a document detection sensor 116.

The bus bridge 104 is provided between a high-speed CPU bus 120 to which CPU 101 is connected and a global bus 122 to which the image controlling unit 105 and so on are connected. Connected to the bus bridge 104 are (i) ROM 102 that stores, for example, the data shared between the CPU bus 120 and the global bus 122 and (ii) RAM 103 which is to be a work area.

The image memory 106, the scanner IF 107, the printer IF 109 are all connected to the image bus 121, which is connected to the image controlling unit 105. Connected to the scanner IF 107 is the scanner unit 108 that reads an image from a document and generates image data. Connected to the printer IF 109 is the printer unit 110 that forms an image based on the image data stored in the image memory 106. The units that are connected to the image bus 121 are publicly known, and detailed explanation will be omitted.

In this embodiment, when the document detection sensor 116 detects that a document is placed on an Automatic Document Feeder (ADF) which is not shown in FIG. 1, the IC tag reader/writer unit 115 transmits, via an antenna (not shown), a signal requesting for communication with an IC tag. The radio communication between the IC tag reader/writer unit 115 and an IC tag may be performed using any of various communication methods defined in ISO 14443, ISO 15693, etc., but the invention is not limited to these methods. Whichever communication method is used, the IC tag reader/writer 115 needs to transmit a signal requesting for communication at first; therefore, in this embodiment, it is arranged so that a request signal is transmitted when the document detection sensor 116 detects a document.

Based on the information read from the IC tag as a result of communication between the IC tag reader/writer 115 and the IC tag, CPU 101 controls operations so that a file server connected to LAN 500 via the network IF 113 is searched for a file, and the display screen shown on the control panel 112 is changed to another display screen. Included in the control panel 112 are, although not shown in the drawing, various keys including a ten-key pad, a start key, a reset key, as well as a display device such as a liquid crystal display panel.

CPU 101 also controls operations so that additional information, that is transmitted along with a print job from the user who has submitted the print job via LAN 500, is written to the IC tag, when an image is formed for the first time on a recording sheet in which an IC tag is embedded.

Explanation will be provided later with regard to the processing at times of image forming by the IC tag reader/writer unit 115 and the processing when a recording sheet comes to the vicinity.

(2) Structure of a Network System

Figure 2:
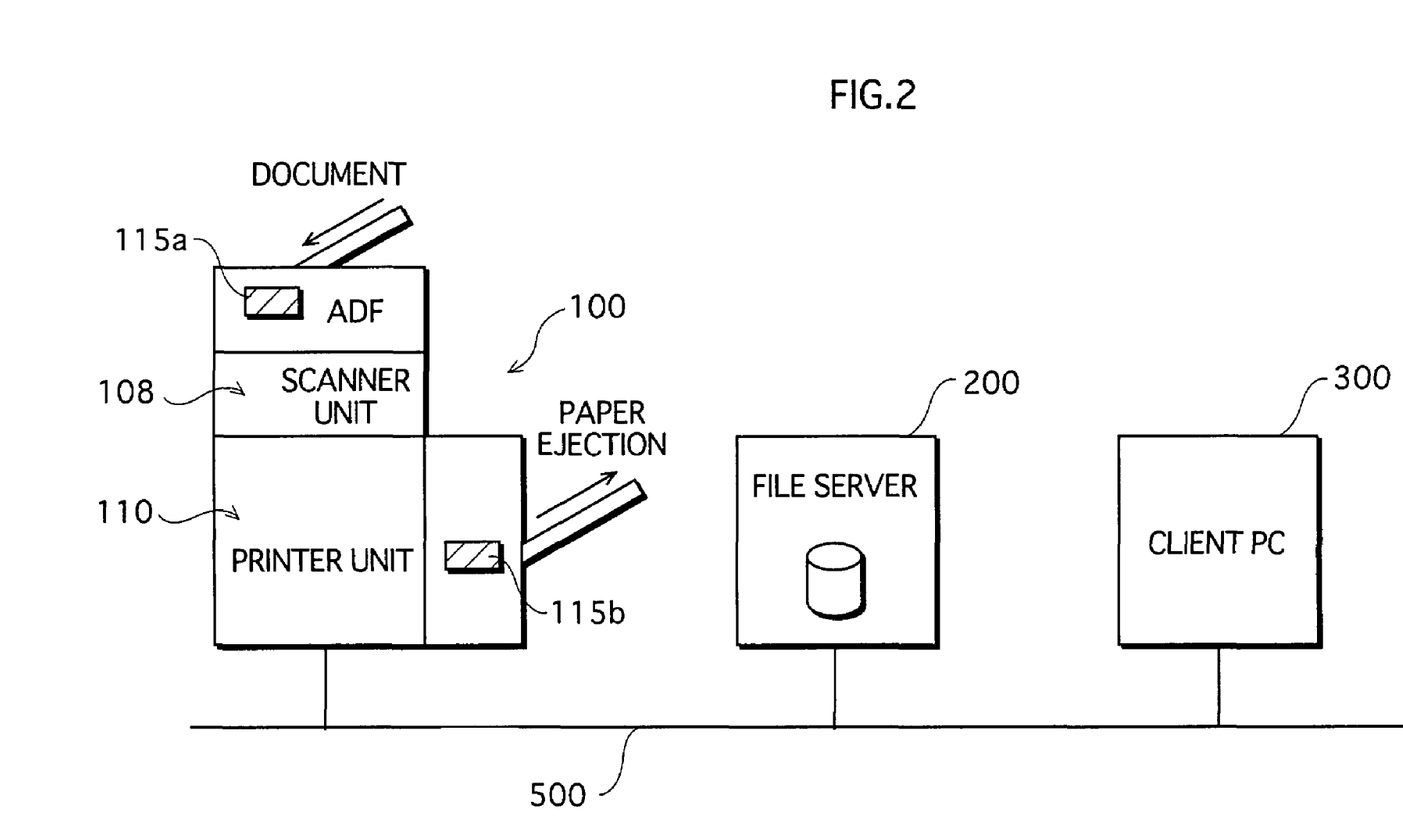
FIG. 2 describes the structure of a network system to which an MFP in the embodiment of the present invention is connected, and the location of the IC tag reader/writer unit in the MFP.

FIG. 2 describes the structure of a network system to which the MFP 100 in this embodiment is connected, and the location of the IC tag reader/writer unit 115 in the MFP 100. A file server 200 and a client PC 300 are connected to LAN 500, which is connected to the network IF 113 of the MFP 100. The MFP 100 forms an image according to either a print job submitted from the client PC 300 or an image scanned by the scanner unit 108. At this time, information is written to the IC tag embedded in a new recording sheet. In a case where information is already stored in the IC tag that is embedded in the document placed on the ADF provided with the MFP 100, the information is read from the IC tag so that a search can be performed in the file server 200, or the display screen shown on the display device included in the control panel 112 can be changed.

As shown in FIG. 2, the IC tag reader-writer unit 115 in this embodiment is provided with communication-purpose antennas disposed at two locations, such as the area where a recording sheet is placed on the ADF (indicated as 115a in the drawing), and the area where the recording sheet on which an image has been formed is to be ejected (indicated as 115b in the drawing), and reads and writes information from and to the IC tag by radio communication; however, generally speaking, when an IC tag and a reader/writer communicate using an electromagnetic induction method, the communication range is approximately one meter, and it is therefore also acceptable to provide an antenna at only one location in the MFP 100.

(3) Processing by Client PC 300 at the Time of Image Forming for the First Time

Next, explanation will be provided with regard to the processing by the client PC 300 from which a print job is submitted at the time of image forming for the first time on a recording sheet in which an IC tag is embedded. In this embodiment, when an image is formed for the first time on a recording sheet in which an IC tag is embedded, information concerned with files related to the image to be formed (hereafter, referred to as "related information") gets written to the IC tag.

Figure 3:
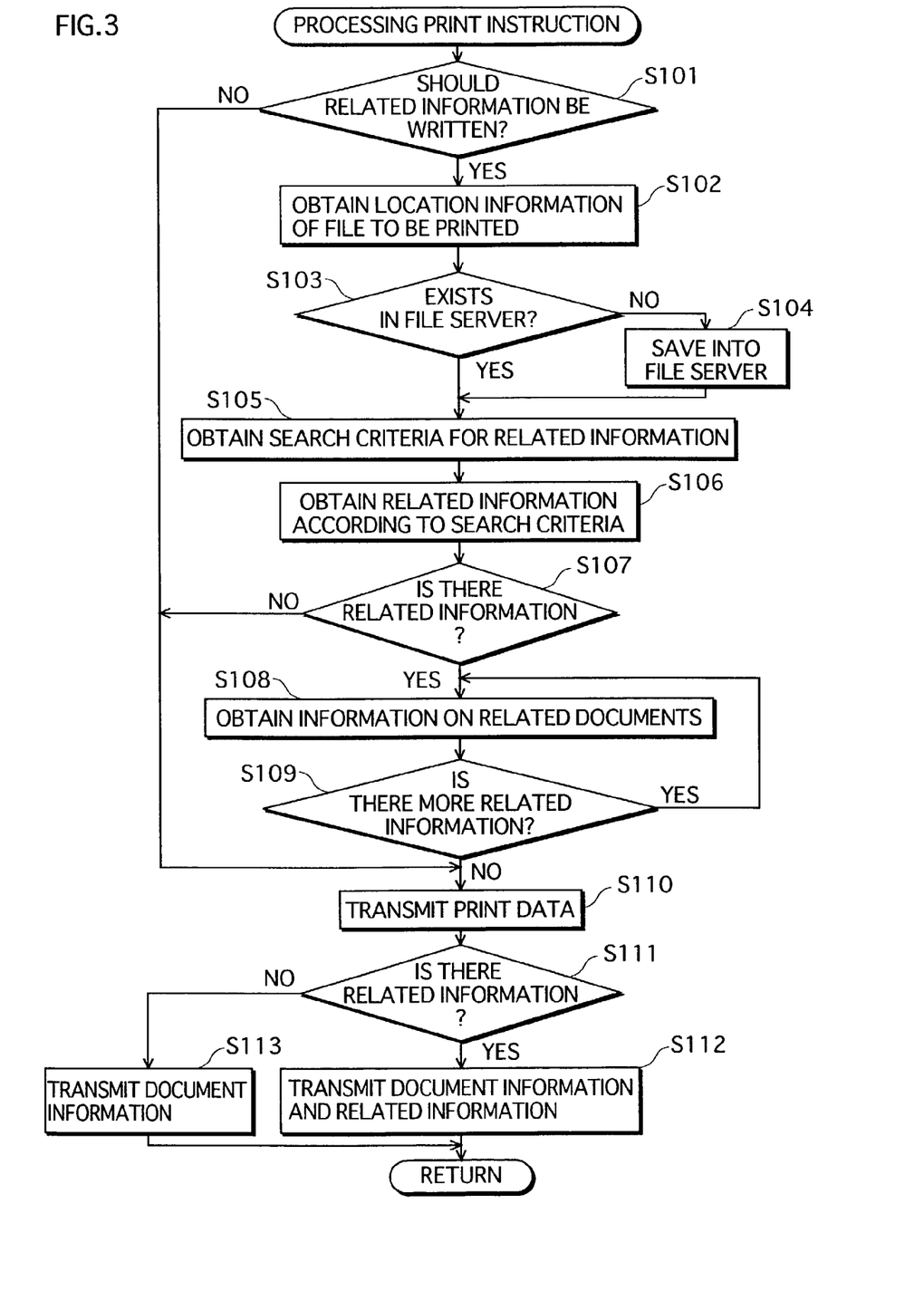
FIG. 3 is a flowchart describing the client PC's processing of a print instruction.

FIG. 3 is a flowchart describing the processing by the client PC 300 of a print instruction. The program for execution of the processing in these flowcharts may be included in, for example, the printer driver installed in the client PC 300. At the time of processing a print instruction, it is judged at first whether the related information is to be written to the IC tag (S101).

Figure 4:
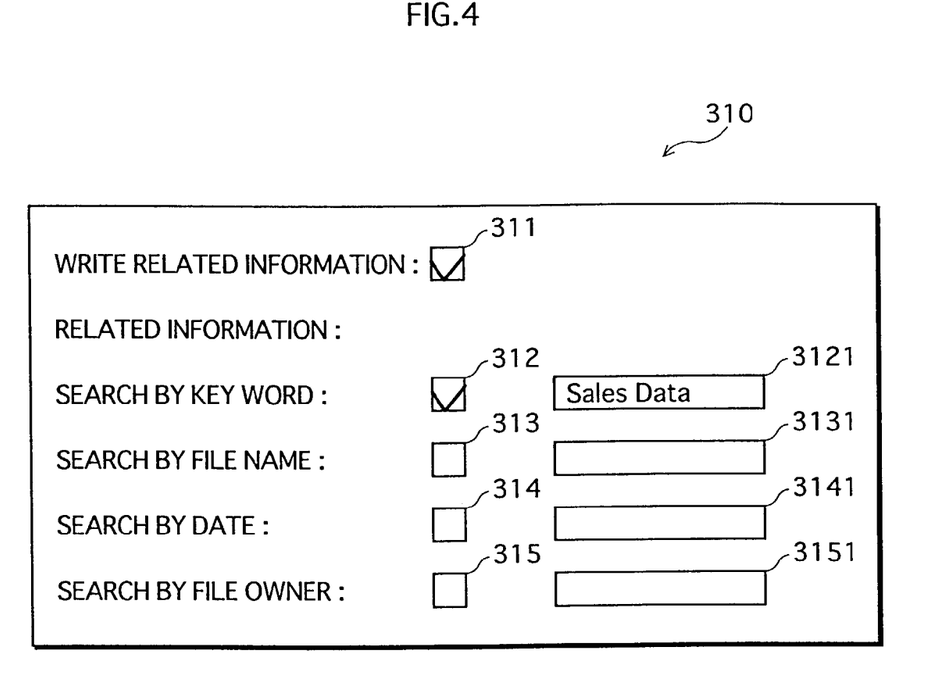
FIG. 4 shows an example of a screen to be displayed on the display of a client PC so that it is possible to select whether related information is to be written to the IC tag as well as to input search criteria along with a file name and key words of the related document files.

Since a display screen 310 shown in FIG. 4, for example, is displayed on the display device of the client PC 300, the user is able to input information including a choice of whether or not the related information is to be written to the IC tag, as well as search criteria used in a search for related information. Displayed in the example shown in the drawing are: a check box 311 for specifying whether the related information is to be written, a check box 312 for specifying whether a search for the related information should be made by a key word, a check box 313 for specifying whether an automatic search for the related information should be made by a file name, a check box 314 for specifying whether an automatic search for the related information should be made by a date, a check box 315 for specifying whether an automatic search for the related information should be made by an owner of the file. It is possible to select one or more from the check boxes 312 to 315. When a check box is checked, it is possible to input in a corresponding text box 3121, 3131, 3141, or 3151, a key word, a file name, a date, or a file owner. When more than one check box is checked among the check boxes 312 to 315, an AND search will be made.

In Step S101, it is judged whether the check box 311 for "Write related information" is checked or not on the aforementioned screen. When it is checked (S101: Yes), information on the location of the file to be printed is obtained (S102). Then, it is judged whether this file exists in the file server 200 or not (S103), and when it does not exist in the file server 200 (S103: No), the file to be printed will be saved into the file server 200 (S104). By saving into the file server a file that has been once printed, when an instruction is given that the same file should be copied at the next occasion, it will be also possible to download the file from the file server and print it.

Next, the search criteria for related information will be obtained (S105). This step is performed by detecting which check boxes are checked in the aforementioned display screen in FIG. 4. Then, the related information will be obtained according to the search criteria (S106). In this step, it is judged whether it is possible to obtain related information by making a search in the file server 200 according to the search criteria.

When there is related information to be written to the contactless IC tag (S107: Yes), related information will be sequentially obtained. Specific examples of related information to be obtained sequentially includes information concerned with a file containing related information (hereafter, referred to as a "related document file"), more specifically, information indicating the location of the related document file (for example, which one of the file server includes the file when more than one file server is connected, and a path name designating the location in the file server) (S108).

When none of the check boxes 312 to 315 is checked as a search criterion in the display screen 310 shown in FIG. 4, it is also possible, in Step S106, to show a list of files that are stored in the file server 200, for example, and have the user select. In that case, related information of the selected file can be sequentially obtained in Steps S108 and S109.

When the check box 312 for a "key word" is checked as a search criterion, a search for a file is made in the file server 200 based on the key word for related information inputted in the text box 3121. The result of the search will be displayed in a list on the client PC 300. The user is able to select one or more of the related document files from among the files shown in the list.

When the check box 313 for a "file name" is checked as a search criterion, a search will be made for a file that has the same name as the one inputted in the text box 3131 but has a different file suffix attached thereto, and a file found in such a way will be treated as a related document file. When nothing is inputted in the text box 3131, it is also acceptable that a search is made for a file that has the same name as the one to be printed. With regard to related information to be obtained sequentially in Step S108, the same explanation as mentioned above can be applied. It is also acceptable to arrange so that related document files found in the search are shown in a list first, and the user selects from the list. The same is true with cases of other search criteria.

When the check box 314 for a "date" is checked as a search criterion, a search is made for a file that matches the date inputted in the text box 3141 (the date may be inputted as a period such as Jan. 1, 2003-Jan. 31, 2003, or using a wild card such as 200201?), and a file found in such a way will be treated as a related document file. When nothing is inputted in the text box 3141, it is also acceptable to make a search for a file that has the same creation date (or the same update date) as the one to be printed and treat such a file as a related document file.

When the check box 315 for a "file owner" is checked as a search criterion, a search is made for a file that matches the file owner inputted in the text box 3151, and a file found in such a way will be treated as a related document file. When nothing is inputted in the text box 3151, it is acceptable to make a search for a file that has the same file owner as the one to be printed, and treat such a file as a related document file.

Figure 5:
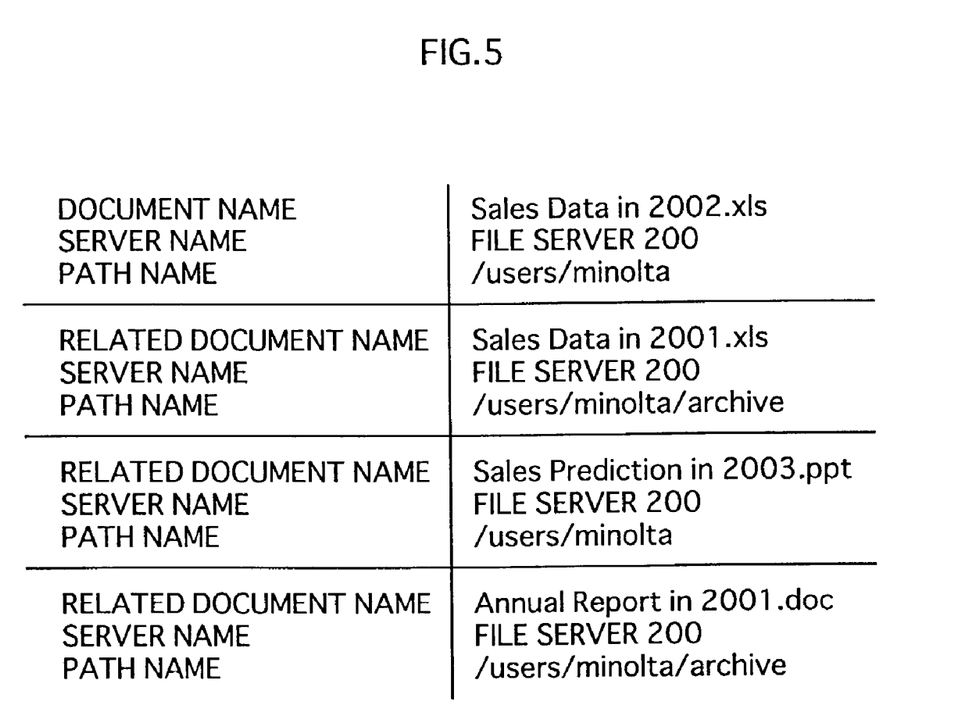
FIG. 5 shows examples of related information.

After all possible related information is obtained from the related document files (S109: No), print data will be transmitted to the MFP 100 (S110). Subsequently, when related information exists (S111: Yes), the related information will be also transmitted in addition to the document information (i.e. information including the file name and location of the file to be printed) (S112). Examples of document information and related information are shown in FIG. 5. When there is no related information, only document information will be transmitted (S113).

(4) Processing by MFP 100 at Times of Image Forming

Figure 6:
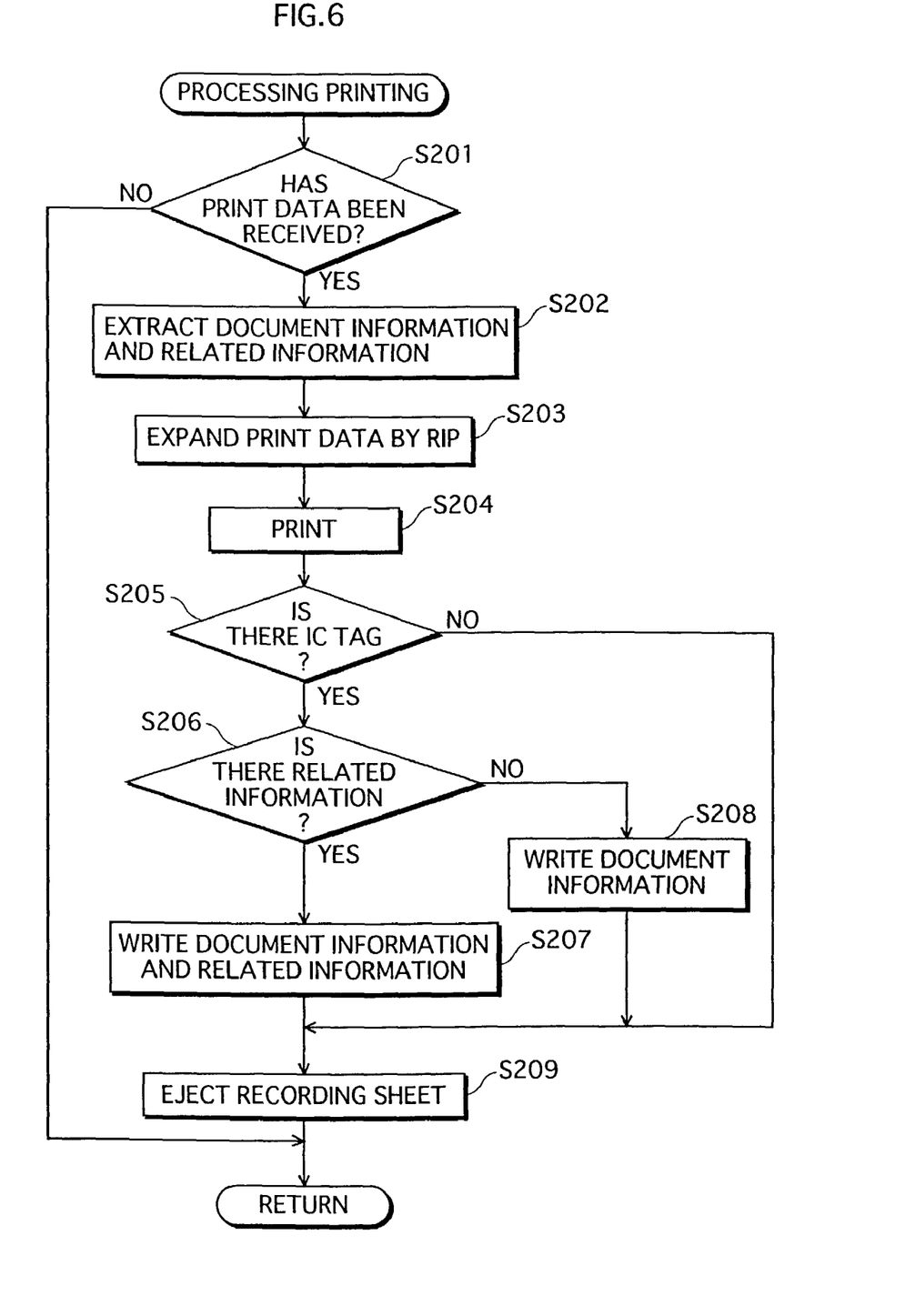
FIG. 6 is a flowchart describing the MFP's processing at times of image forming.

The following describes the processing by the MFP 100 at times of image forming based on the print data transmitted from the client PC 300 as mentioned above. FIG. 6 is a flowchart describing the processing of the MFP 100 at times of image forming. As shown in the drawing, in this embodiment, it is arranged so that the printing process in the drawing is invoked from the main routine (not shown in the drawing) operated in the MFP 100. When print data has not been received (S201: No), there will be no printing process to be performed, and the process returns to the main routine.

When print data has been received (S201: Yes), document information and related information will be extracted from the received data (S202). Then, the print data from which an image is to be formed will be expanded to image data by an RIP (raster image processor) (S203), and printing on the recording sheet will be executed (S204). The processing in each of these steps is publicly known, and detailed explanation will be therefore omitted.

Next, it is detected whether an IC tag is embedded in the recording sheet by transmitting a predetermined request signal from the IC tag reader/writer unit 150. When an IC tag is embedded (S205: Yes) and also related information exists (S206: Yes), document information and related information will be written to the IC tag (S207). When an IC tag is embedded, but there is no related information to be written (S206: No), only document information will be written to the IC tag (S208). Then, the recording sheet will be ejected (S209), and the printing process will be completed.

(5) Processing by MFP 100 When an IC Tag Comes to its Vicinity

The following explains the processing by the MFP 100 when, for example, a recording sheet in which an IC tag storing information is embedded is placed on the ADF. The IC tag reader/writer unit 150 transmits a request signal intermittently according to a communication method defined in e.g. ISO 14443 or ISO 15693, as mentioned before. Communication methods are not limited to these, and it is optional which communication method should be used; therefore, detailed explanation on communication methods will be omitted. When an IC tag exists in the vicinity, the IC tag will transmit a response signal in response to the request signal. Then, the IC tag reader/writer unit 150 is able to read information from the IC tag through radio communication between them.

Figure 7:
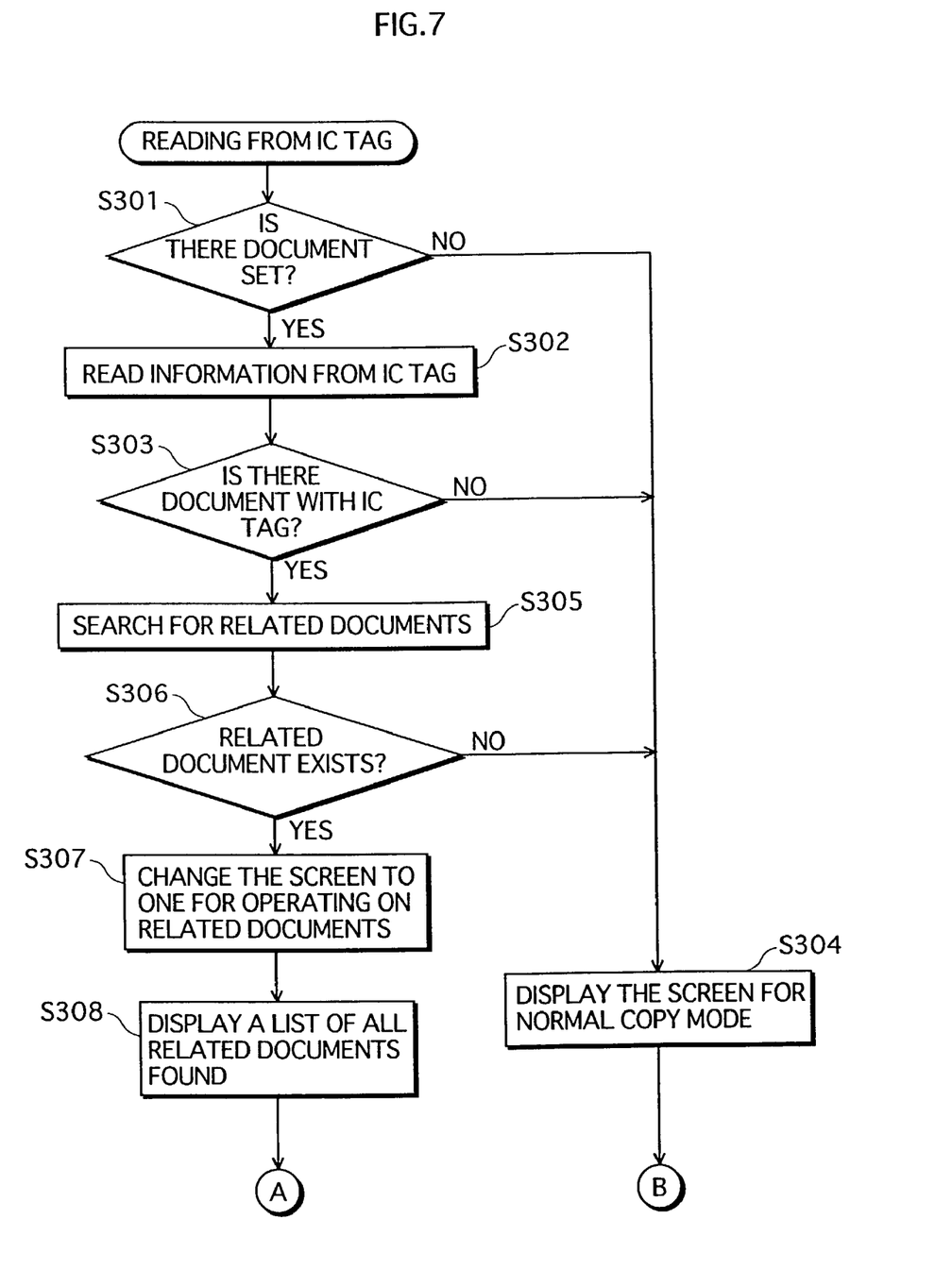
FIG. 7 is a flowchart describing the MFP's processing at times of reading information from an IC tag.
Figure 8:
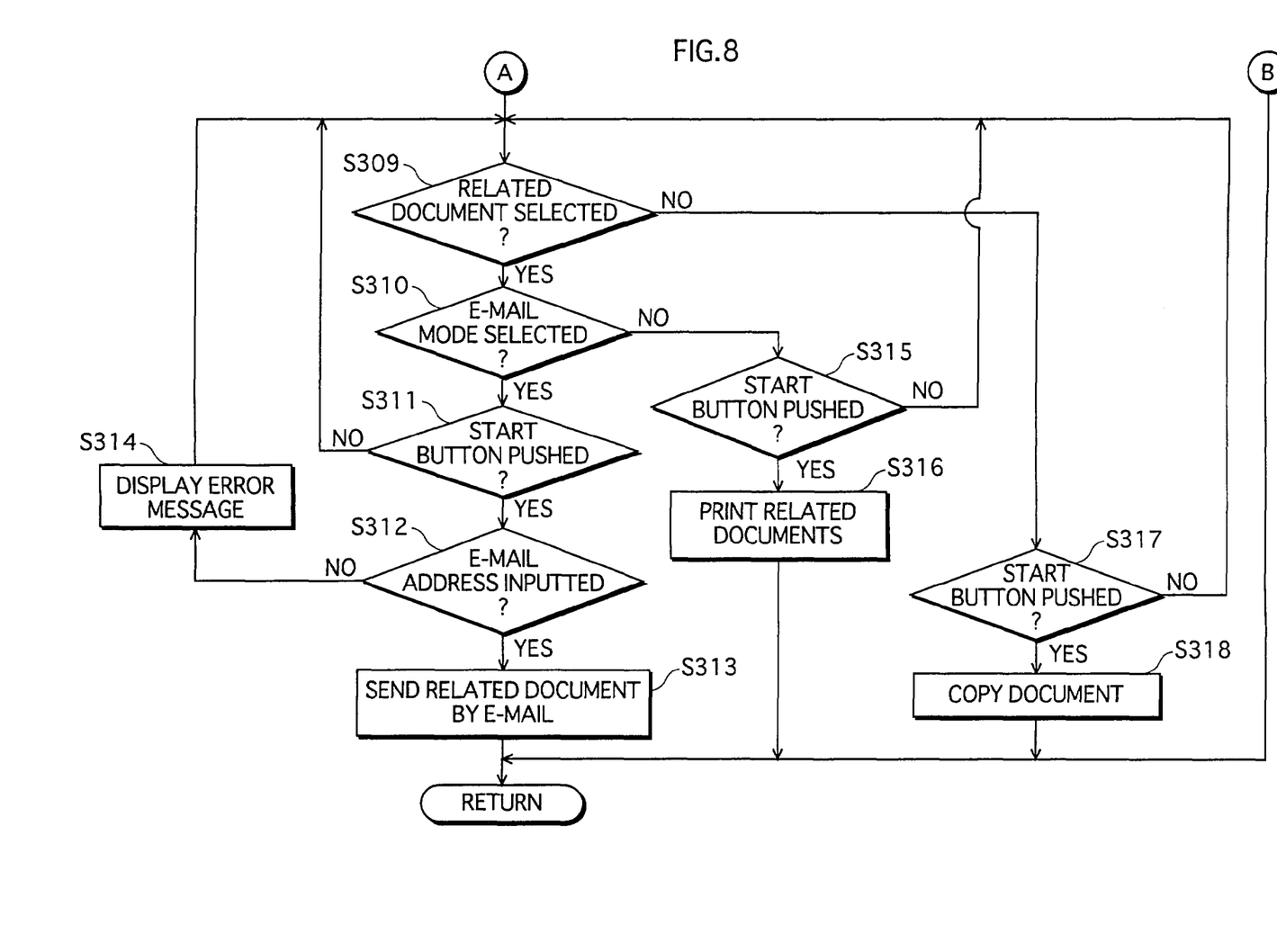
FIG. 8 is a flowchart describing the MFP's processing at times of reading information from an IC tag.

FIGS. 7 and 8 are flow charts describing the processing by the MFP 100 at times of reading information from an IC tag. In this embodiment, it is arranged so that, when it is detected by the document detection sensor 116 provided with the ADF that a document is set (S301: Yes), the aforementioned processing such as transmitting a request signal will be performed, and then information will be read from the IC tag (S302). It is arranged in this way because there may be some cases where it is not appropriate to perform the subsequent processing when it is merely a person passing by the MFP that carries a document with an IC tag.

Figure 9A:
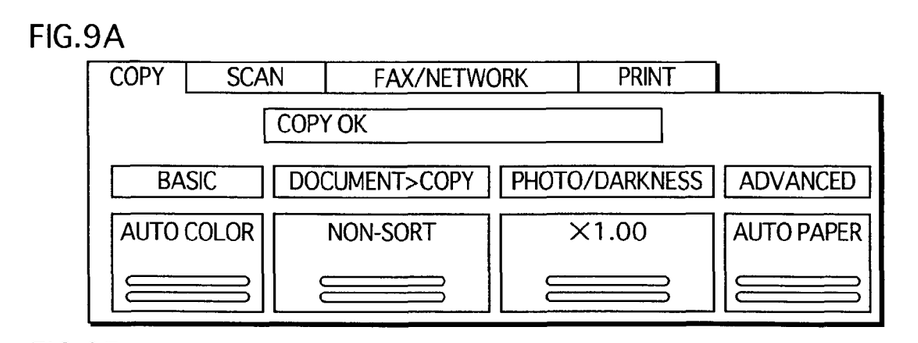
FIG. 9A shows an example of a screen displayed on a control panel in the normal copy mode.

When a document is not set on the ADF (S301: No), or when a document is set but there is no document in which an IC tag is embedded (S303: No), the normal copy mode display screen as shown in FIG. 9A will be displayed in the control panel (S304). Generally speaking, functions that can be operated from the control panel of a multi-function image processing apparatus includes (i) "copy mode" to make a copy of a document, (ii) "scan mode" to scan and electronize a document and store it in a file server or transmit it to a PC, (iii) "fax/network mode" to send a document by fax or e-mail, and (iv) "print mode" to manually print documents that have previously stored. Among these functions, the copy mode is more frequently used; therefore, the display screen for the copy mode is set as the normal display screen. When there is a document in which an IC tag is embedded (S303: Yes), a search is made for related documents in the file server 200 based on related information read from the IC tag (S305).

Figure 9B:
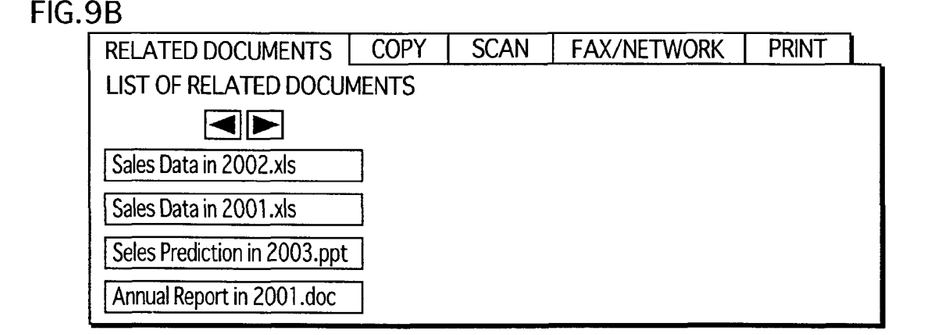
FIG. 9B shows an example of a screen for operating on the related documents.
Figure 9C:
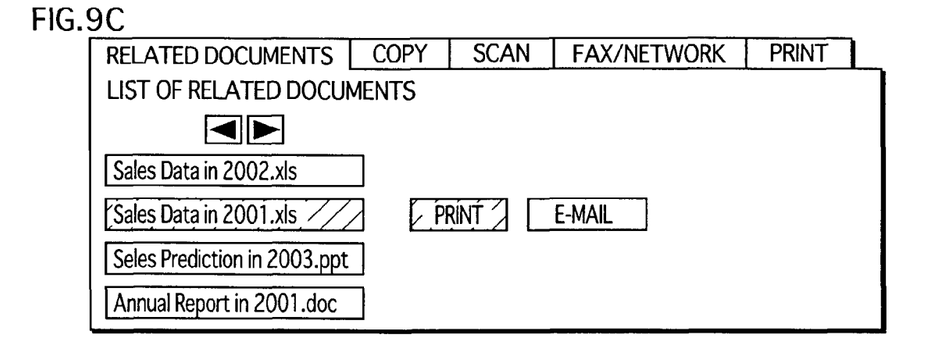
FIG. 9C shows that the document "Sales Data in 2002" is selected from among the related documents.
Figure 9D:
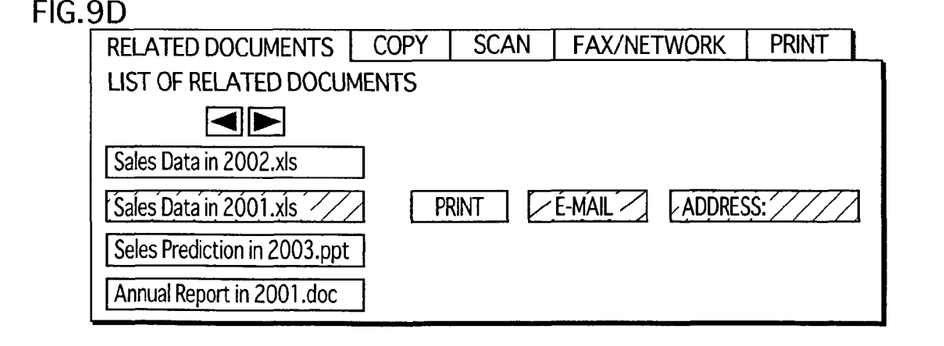
FIG. 9D shows that sending the document "Sales Data in 2002" by e-mail is selected.

In this embodiment, when one or more related document files are found as a result of the search (S306: Yes), it is determined that the related documents should be processed, and the display screen indicated on the display device such as a liquid crystal display panel provided in the control panel 112 will be changed to a display screen, as shown in FIG. 9B, for operating on the related documents (S307), and a list of the related documents found from the search will be shown (S308). In the example shown in FIG. 9B, the file name of the document is indicated as "Sales Data in 2002.xls" according to the document information stored in the IC tag that is embedded in the document placed on the ADF in the MFP 100, and it is indicated as related information that there are files of the related documents "Sales Data in 2001.xls", "Sales Prediction in 2003.ppt", and "Annual Report in 2001.doc" existing in the file server 200. The user is able to select one of the related documents, (FIG. 9C shows that "Sales Data in 2001.xls" is selected). When a related document is selected, the choices of PRINT or E-MAIL will be shown as processing to be applied to the selected related document. Then, it will be possible to download the selected file "Sales Data in 2001.xls" from the file server 200 and print it (as shown in FIG. 9C, it is possible to print the file "Sales Data in 2001.xls" by pushing the start key while "PRINT" is selected), or send it by e-mail to an inputted address (see FIG. 9D).

The MFP 100's processing at times of printing a related document or sending a related document by e-mail as so far explained is shown in the flowchart of FIG. 8. More specifically, it is judged whether any of the related documents is selected (S309), and when judged in the affirmative (S309: Yes), and also the e-mail mode is selected (S310: Yes) and the start button is pushed (S311: Yes), as well as an e-mail address has been inputted (S312: Yes), the selected related document will be sent to the inputted e-mail address (S313). When the start button is pushed (S311: Yes) but no e-mail address has been inputted (S312: No), an error message will be displayed (S314), and the process returns to Step S309.

When the e-mail mode is not selected in Step S310 (S310: No), the print mode will be selected in this embodiment. After the start button is pushed (S315: Yes), the selected related document will be printed (S316), and the process returns to the main routine which is not shown in the drawing. In this embodiment, when no related document is selected (S309: No), and after the start button is pushed (S317: Yes), a copy of the document set on the ADF will be made, as a processing for the set document itself (as part of normal processing which includes image reading and image forming) (S318).

As so far explained, the MFP in this embodiment reads information from the IC tag using the IC tag reader/writer unit 115 included in the reading unit, when a document in which a contactless IC tag is embedded is placed on the ADF, and changes the display screen shown in the display device such as a liquid crystal display panel in the control panel. Then, the MFP makes a search in the file server 200 based on related information and when related document files are found, a list of the related document files will be displayed on the display screen. It will be very user-friendly because the user is able to print or send by e-mail, with a simple operation, the file selected from among the listed related document files.

In addition, the computer programs (including the programs to be installed in the client PC and to be used inside the MFP) that actualize the present invention may be recorded onto various kinds of computer-readable recording media e.g. magnetic tapes, magnetic discs such as flexible discs, optical recording media such as DVD, CD-ROM, CD-R, MO, PD, and flash-memory type recording media such as SmartMedia (a registered trademark) and Compact Flash (a registered trademark) The computer programs may be manufactured and distributed in the form of recording media, or transferred and provided in the form of programs via various kinds of wired and wireless networks including the Internet, broadcast, tele-communication circuits and satellite communication.

The computer program for the present invention does not need to include all the modules for having the computer execute the processing that have been explained above. It is acceptable to have the computer execute the processing in the present invention by utilizing various general-purpose programs that can be separately installed into data processing devices, such as a communication program or programs included in an OS (operating system). Accordingly, the aforementioned recording media used for the present invention do not necessarily need to store all the aforementioned modules, and not all the modules need to be transferred necessarily. In some cases, it is also possible to execute predetermined parts of the processing with use of special hardware.

Modifications

The present invention has been so far explained based on the preferred embodiment; however, the present invention is not limited to the specific example described as the embodiment, and modifications as below are possible.

(1) In the embodiment, explanation was provided on a case where a recording sheet in which an IC tag is embedded is used; however, a contactless information medium such as an IC tag does not need to be embedded in a recording sheet, and it is possible to apply the present invention to a case where an IC card as an example of a contactless information medium is inserted into a mobile phone. That is because it can be also arranged so that the display screen of the control panel gets changed when an IC card pre-storing predetermined information comes to the vicinity of the MFP.

(2) In the embodiment above, related information is written to a contactless IC tag, and when the related information is read, it is determined that the processing is performed on the related document, and a list of related documents is displayed on the display screen; however, the processing is not limited to this, and there are many other possible modifications: e.g. It may be arranged so that display screen can be changed between the copy mode and the fax transmission mode based on the information stored in the contactless IC tag (for instance, storing an indication of either "an inter-office document" or "external communication"). It may be arranged so that when an indication of "meeting use" is stored, it is determined that the copy mode will be used and the number of copies to be made will be automatically changed.

Figure 10A:
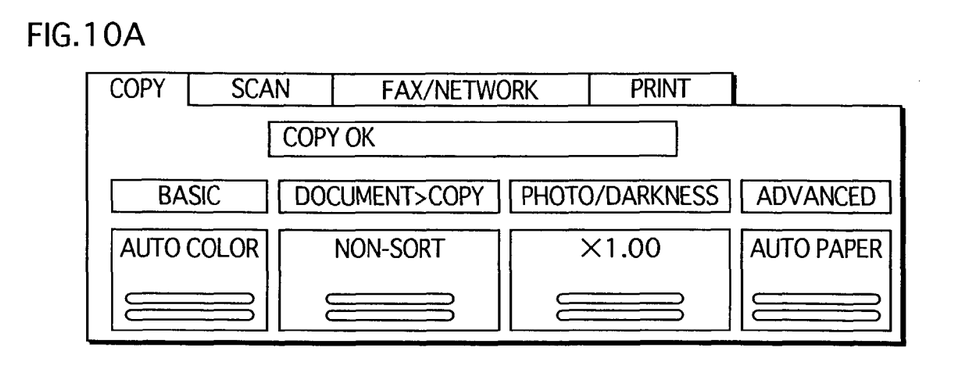
FIGS. 10A, 10B, and 10C. show examples of screens for operating on the related documents in a modification of the present invention.
Figure 10B:
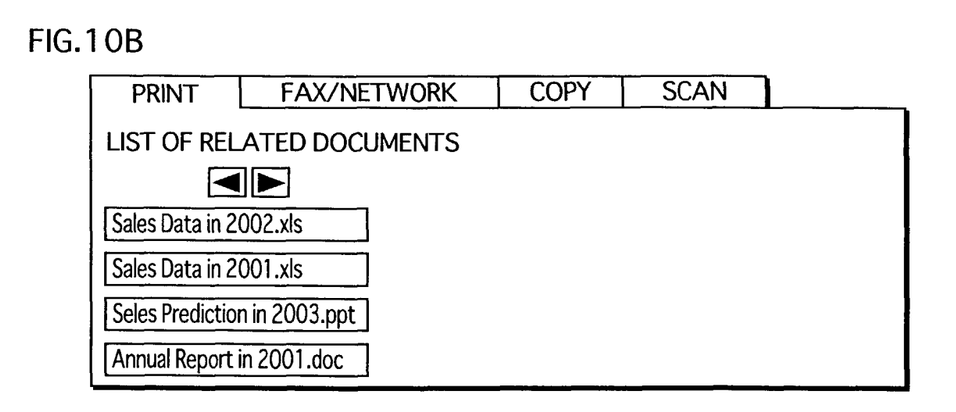
Figure 10C:
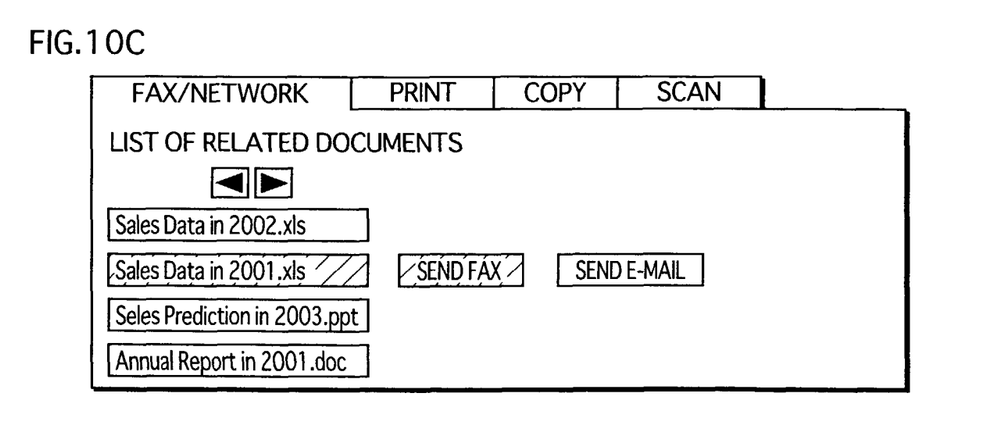

(3) When there is a related document, the function for operating on the related document (i.e. printing, faxing, or e-mailing the related document) is probably more likely to used than making a copy of the document having been set; therefore, it may be arranged so that a display screen for the print mode is displayed as shown in FIG. 10B, or a display screen for the fax/network mode is displayed as shown in FIG. 10C. Thus, it is possible to make the apparatus more user-friendly.

(4) In the embodiment, explanation is provided for a case where one type of information (document information and related information) is stored in the IC tag; however, there may be a case where different types of information are stored in each of a plurality of recording sheets with IC tags. In such a case, it may be arranged so that the control panel includes a button for switching the display screen in turns for different pieces of related information. In addition, when there is some other information besides document information and related information, it may be arranged so that another procedure is added to that process to change the display screen according to the types of information.

(5) Furthermore, in the embodiment, explanation is provided for a case where, when images are formed on a plurality of recording sheets from one print job, the same piece of information is written to each of the IC tags embedded in those recording sheets; however, it is also possible to arrange so that different pieces of related information are written to different pages, for example, even from one print job. This arrangement will be made possible by enabling the client PC 300 to set different pieces of related information for each page, and enabling the MFP 100 to read an identifier individually assigned to each IC tag and write different pieces of information on different pages. As for the processing in a case where a plurality of documents to which different pieces of related information are written are placed on the ADF, the same idea is applied as in the aforementioned case where IC tags store different pieces of information corresponding to different documents.

(6) In the embodiment, the files to be printed are stored in a file server that is connected to a multi-functional image processing apparatus via a network; however, it is also acceptable to supply the multi-functional image processing apparatus with a storage device and store files to be printed therein.

(7) In the embodiment, information gets stored in an IC tag at the time when printing is performed based on a print job sent from a client PC; however, it is also acceptable that, at the time when the multi-functional image processing apparatus processes normal copying, image data resulting from scanning of the document gets stored in the file server at the same time as location information stored in the file server (i.e. document information) gets written to the recording sheet.

(8) Finally, in the embodiment, the display screen is changed and a file search is performed based on information stored in an IC tag; however, it is not limited to an IC tag, and it is also acceptable to arrange so that a file search and the like are performed based on information obtained through an image (e.g. a two-dimensional bar code) that has been read by the scanner unit, for example.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. An image processing apparatus comprising:
   a reader configured to read, by radio communication, data stored in a contactless integrated circuit (IC) tag embedded in a recording sheet on which a predetermined image has been formed, the recording sheet being disposed in a position to transmit the data to the reader, the data including information identifying a first document file corresponding to the predetermined image, and related information including one or more search criteria capable of identifying related document files that are related to the first document file and are different from the first document file;
   a first controller configured to perform a search for the related document files using the search criteria stored in the IC tag;
   a display; and
   a second controller configured to control the display to show a display screen including a list of related document files identified by the search;
   wherein the search criteria comprise (i) a filename, date, or owner of the first document file, and (ii) a search keyword, and the search criteria is used to search for the related document files.

2. The image processing apparatus of claim 1, wherein the apparatus is connected to a network; and
   wherein the first controller is configured to perform the search for the related document files in an external file server connected via the network to the image processing apparatus.

3. The image processing apparatus of claim 1, wherein the apparatus is configured as a multi-functional peripheral equipped with a plurality of processing functions.

4. The image processing apparatus of claim 3, wherein when the related document files are found as a result of the search, the display of the display screen is switched to an operation screen for the related documents.

5. The image processing apparatus of claim 3,
   wherein the plurality of processing functions includes a printing function; and
   wherein the image processing apparatus further comprises a writer configured, at a time of printing on a sheet of paper, to write information into a contactless IC tag embedded in the sheet of paper.

6. An image processing apparatus comprising:
   a reader configured to read data transmitted by a contactless integrated circuit (IC) tag embedded in a recording sheet on which a predetermined image has been formed, the recording sheet being disposed in a position to transmit the data to the reader, the data including information identifying a first document file corresponding to the predetermined image, and related information including one or more search criteria capable of identifying related document files that are related to the first document file and are different from the first document file;
   a first controller configured to perform a search for the related document files using the search criteria stored in the IC tag;
   a display; and
   a second controller configured to control the display to show a display screen including a list of related document files identified by the search;
   wherein the search criteria comprise (i) a filename, date, or owner of the first document file, and (ii) a search keyword, and the search criteria is used to search for the related document files.

7. The image processing apparatus of claim 6,
   wherein the apparatus is connected to a network;
   wherein the first controller is configured to perform the search for the related document files in an external file server connected via the network to the image processing apparatus.

8. The image processing apparatus of claim 6, wherein the apparatus is configured as a multi-functional peripheral equipped with a plurality of processing functions.

9. The image processing apparatus of claim 8, wherein a selection of one related document file out of the related document files and a selection of one function out of the plurality of processing functions is configured to apply to the selected related document file and is formed on the display screen showing the list of the related document files.

10. The image processing apparatus of claim 8,
    wherein the plurality of processing functions includes a printing function, and
    wherein the image processing apparatus further comprises a writer that, at a time of printing on a sheet of paper, writes information into a contactless IC tag embedded in the sheet of paper.

11. The image processing apparatus of claim 10,
    wherein the apparatus is connected to a network;
    and wherein the writer is configured to write the information into the contactless IC tag according to an instruction from a computer connected via the network to the image processing apparatus.

12. The image processing apparatus of claim 11, wherein the information written by the writer is configured so that said information is specified on a side of the computer.

13. The image processing apparatus of claim 6, wherein the information read from the document shows a location of each of the related document files.

14. The image processing apparatus of claim 6, wherein when the reader fails to read the data from the IC tag, the second controller does not control the display to show the display screen.

15. The image processing apparatus of claim 6, further comprising an automatic document feeder, and the reader is configured to read information from a document being sent through the automatic document feeder.

16. An image processing apparatus comprising:

a reader configured to read data stored in a contactless integrated circuit (IC) tag embedded in a recording sheet on which a predetermined image has been formed, the recording sheet being disposed in a position to transmit the data to the reader, and related information including one or more search criteria capable of identifying related document files that are related to the first document file and are different from the first document file;

a first controller configured to perform a search for the related document files using the search criteria stored in the IC tag;

a display;

a second controller configured to control the display to show a list of related document files identified by the search, together with accompanying graphical selection tools allowing a user to select one or more processing functions to perform on one or more of the related document files in the list;

a start button configured to initiate the performance of one or more processing functions on one or more related document files selected from the list when the start button is operated;

a third controller configured to process the first document file if the start button is operated when none of the related document files in the list is selected;

wherein the search criteria comprise (i) a filename, date, or owner of the first document file, and (ii) a search keyword, and the search criteria is used to search for the related document files.

17. The image processing apparatus of claim 16, including at least a copying function, wherein the third controller is configured so that it processes the sent document by making a copy thereof.

18. The image processing apparatus of claim 1, wherein the display screen presents options allowing a user to e-mail or print any of the related document files contained in the list.

* * * * *